United States Patent
Wu et al.

(10) Patent No.: US 11,455,263 B2
(45) Date of Patent: Sep. 27, 2022

(54) FAN COMMUNICATION METHOD AND RELATED FAN SYSTEM

(71) Applicant: Wiwynn Corporation, New Taipei (TW)

(72) Inventors: Yi-Zhe Wu, New Taipei (TW); Chih-Yuan Lin, New Taipei (TW); Chih-Yuan Hung, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 17/027,726

(22) Filed: Sep. 22, 2020

(65) Prior Publication Data

US 2022/0050796 A1    Feb. 17, 2022

(30) Foreign Application Priority Data

Aug. 13, 2020    (TW) ................................. 109127539

(51) Int. Cl.
*G06F 13/20* (2006.01)
*G05B 15/02* (2006.01)
*G06F 13/42* (2006.01)

(52) U.S. Cl.
CPC ............. *G06F 13/20* (2013.01); *G05B 15/02* (2013.01); *G06F 13/4282* (2013.01); *G06F 2213/0016* (2013.01)

(58) Field of Classification Search
CPC ................. G06F 13/20; G06F 13/4282; G06F 2213/0016; G05B 15/02
USPC ........................... 710/5, 8, 14, 16, 18, 30, 62
See application file for complete search history.

(56) References Cited

U.S. PATENT DOCUMENTS

| | | | | |
|---|---|---|---|---|
| 5,727,928 A | * | 3/1998 | Brown | F04D 27/008 361/23 |
| 6,008,603 A | * | 12/1999 | Jones | H02P 25/024 318/400.32 |
| 6,381,406 B1 | * | 4/2002 | Smith | H02P 23/186 318/799 |
| 7,141,950 B1 | * | 11/2006 | Verge | H05K 7/20209 318/400.29 |
| 7,151,349 B1 | * | 12/2006 | Williamson | F04D 27/004 318/599 |
| 7,327,114 B2 | * | 2/2008 | Verge | H05K 7/20209 318/599 |
| 7,612,508 B2 | * | 11/2009 | Jreij | H05K 7/20209 318/268 |
| 2006/0152891 A1 | | 7/2006 | Jreij | |
| 2009/0150122 A1 | * | 6/2009 | Dang | G06F 11/2221 702/183 |
| 2012/0131249 A1 | * | 5/2012 | Cepulis | G06F 13/362 361/679.48 |

(Continued)

FOREIGN PATENT DOCUMENTS

CN    108809163 A    11/2018

*Primary Examiner* — Idriss N Alrobaye
*Assistant Examiner* — Henry W Yu
(74) *Attorney, Agent, or Firm* — Winston Hsu

(57) ABSTRACT

A communication method for a fan includes transmitting an initial signal with a specific duty cycle pattern to the fan; entering a communication mode after the fan receives the initial signal; reading information of the fan by a firmware of the fan; and transforming the information of the fan into a fake tachometer (TACH) signal and transmitting the fake TACH signal to a controller via a TACH signal line under the communication mode.

8 Claims, 3 Drawing Sheets

(56) References Cited

U.S. PATENT DOCUMENTS

| | | | |
|---|---|---|---|
| 2012/0313662 A1* | 12/2012 | Tian | G01P 21/00 324/765.01 |
| 2013/0229140 A1* | 9/2013 | Busch | G06F 1/20 318/811 |
| 2017/0068258 A1* | 3/2017 | Lyon | G06F 1/206 |

* cited by examiner

US 11,455,263 B2

FAN COMMUNICATION METHOD AND RELATED FAN SYSTEM

BACKGROUND OF THE INVENTION

1. Field of the Invention

The present disclosure relates to a communication method for a fan and a related fan system, and more particularly, to a communication method for a fan and a related fan system capable of remotely reading information of the fan to reduce labor and time.

2. Description of the Prior Art

Conventional fan equipment applied to servers of a data center often needs to be replaced because of equipment updates, aging or expansion. Maintenance personnel have to check and record related information such as the manufacturer, manufacturing date, product name, serial number, firmware version and hours of operation of the fan equipment in order to determine whether or not the fan equipment should be changed. This requires a large amount of labor and time, and when an amount of the fan equipment is significant, loading of the servers of the data center will be increased. Therefore, improvements to the conventional fan equipment are necessary.

SUMMARY OF THE INVENTION

The present invention provides a communication method for a fan and a related fan system that can remotely read the information of the fan, to achieve the objectives of reduced labor and time.

An embodiment of the present invention discloses a communication method for a fan, comprising the steps of: transmitting an initial signal with a specific duty cycle pattern to the fan; entering a communication mode after the fan receives the initial signal; reading information of the fan by a firmware of the fan; and transforming the information of the fan into a fake tachometer (TACH) signal and transmitting the fake TACH signal to a controller via a TACH signal line under the communication mode.

Another embodiment of the present invention discloses a fan system comprising: a controller, configured to transmit an initial signal with a specific duty cycle pattern; and a fan, configured to receive the initial signal, enter a communication mode after receiving the initial signal to read information of the fan, and transform the information of the fan into a fake tachometer (TACH) signal, such that the fake TACH signal is transmitted to a controller via a TACH signal line under the communication mode.

These and other objectives of the present invention will no doubt become obvious to those of ordinary skill in the art after reading the following detailed description of the preferred embodiment that is illustrated in the various figures and drawings.

DETAILED DESCRIPTION

A conventional fan applied to server equipment of a data center transmits revolution speed information through a TACH (tachometer) signal line. A controller or a fan driving integrated circuit (IC) of the server equipment receives the revolution speed information from the fan, and the revolution speed information is transmitted through a pulse width modulation (PWM) signal line for controlling the fan. Without adding extra circuits or modifying circuits to the conventional server equipment of the data center, an embodiment of the present invention provides a fan system which is implemented via the conventional PWM signal line and the TACH signal line.

Figure 1:
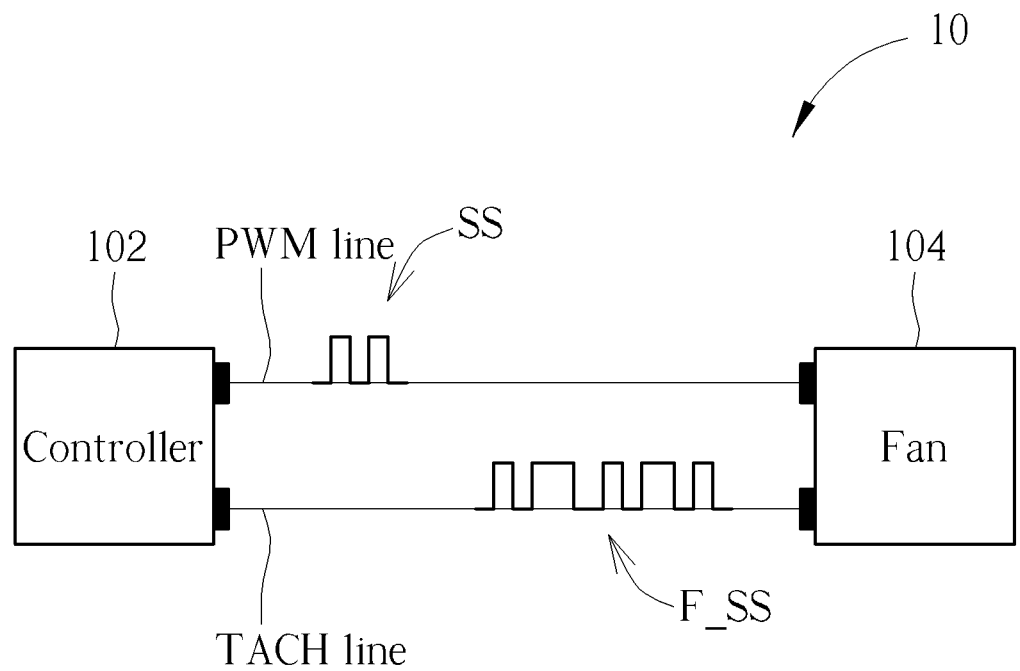
FIG. 1 is a schematic diagram of a fan system according to an embodiment of the present invention.

Refer to FIG. 1, which is a schematic diagram of a fan system 10 according to an embodiment of the present invention. The fan system 10 includes a controller 102 and a fan 104. The controller 102 is configured to transmit an initial signal SS with a specific duty cycle pattern. The controller 102 may be a controller chip or a fan driving integrated circuit (IC) in the fan system 10 to control the fan 104. The fan 104 is configured to receive the initial signal SS, and enter a communication mode after receiving the initial signal SS. Information corresponding to the fan 104 such as manufacturer, manufacturing date, product name, serial number, firmware version and hours of operation of the fan 104 are read, and this information is transformed into a fake TACH signal F_SS. The fan 104 transmits the fake TACH signal F_SS to the controller 102 through a TACH signal line under the communication mode. This allows the fan system 10 to remotely read the information of the fan without the need for adding extra circuits or modifying circuits of the conventional server equipment.

The controller 102 is configured to transmit a PWM signal through a PWM signal line to the fan 104 for controlling a revolution speed of the fan 104: for example, a 40% duty cycle of the PWM signal is utilized for controlling the revolution speed of the fan 104 as 1500 rounds per minute (rpm). Thus, before the fan system. 10 receives the initial signal SS, the fan 104 transmits the revolution speed information corresponding to the fan 104 (e.g. 1500 rpm) under a normal mode. The revolution speed information may be transformed into a corresponding revolution speed signal, e.g. 1500 rpm may be transformed into a revolution speed signal of 200 Hertz (Hz), and this is transmitted to the controller 102 through the TACH signal line.

Figure 2:
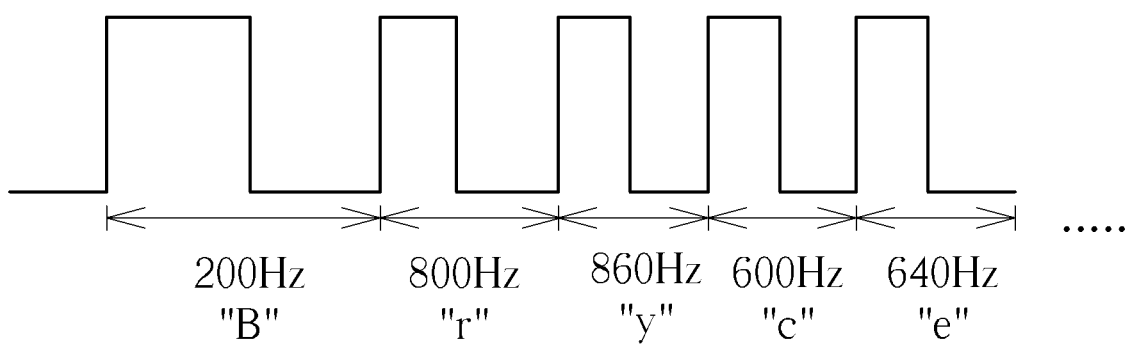
FIG. 2 is a schematic diagram of a fake TACH signal according to an embodiment of the present invention.

The controller 102 transmits the initial signal SS with the specific duty cycle pattern to the fan 104 through the PWM signal line, e.g. the duty cycle is transformed from 5% to 20% and then to 10% in 200 ms. The fan 104 enters the communication mode from the normal mode after receiving the initial signal SS. In an embodiment, when the fan 104 is in the communication mode, a firmware of the fan 104 may read the information corresponding to the fan 104 and then transform the corresponding information into the fake TACH signal F_SS, such that the fake TACH signal F_SS is transmitted to the controller 102 through the TACH signal line when the fan 104 is under the communication mode. A bit string is generated according to the fake TACH signal F_SS by referencing a mapping table, which maps different signal frequencies to different characters. FIG. 2 is a schematic diagram of the fake TACH signals F_SS according to an embodiment of the present invention. In the example illustrated in FIG. 2, the 200 Hz signal represents character "B", the 800 Hz signal represents character "r", the 860 Hz signal represents character "y", the 600 Hz signal represents character "c", and the 640 Hz signal represents character "e", allowing the controller 102 to decipher the received fake TACH signal F_SS shown in FIG. 2 as "Bryce". The fan 104 may transmit the fake TACH signal F_SS corresponding to the information of the fan 104 to the controller 102 through the TACH signal line.

Notably, a frequency characteristic of the fake TACH signal F_SS and the revolution speed signal for carrying the revolution speed information of the fan 104 are identical. The information carried by the fake TACH signal F_SS, however, is not related to the revolution speed of the fan 104. Under the communication mode and without changing the structure of the conventional server equipment, the controller 102 may obtain the corresponding information of the fan according to the fake TACH signal F_SS received through the TACH signal line, by referencing the mapping table. As such, even when an amount of fan equipment used by the data center is large, original hardware circuits of the server equipment do not need to be modified, and the fan system 10 may remotely read the information of the fan to significantly reduce labor costs and time.

Figure 3:
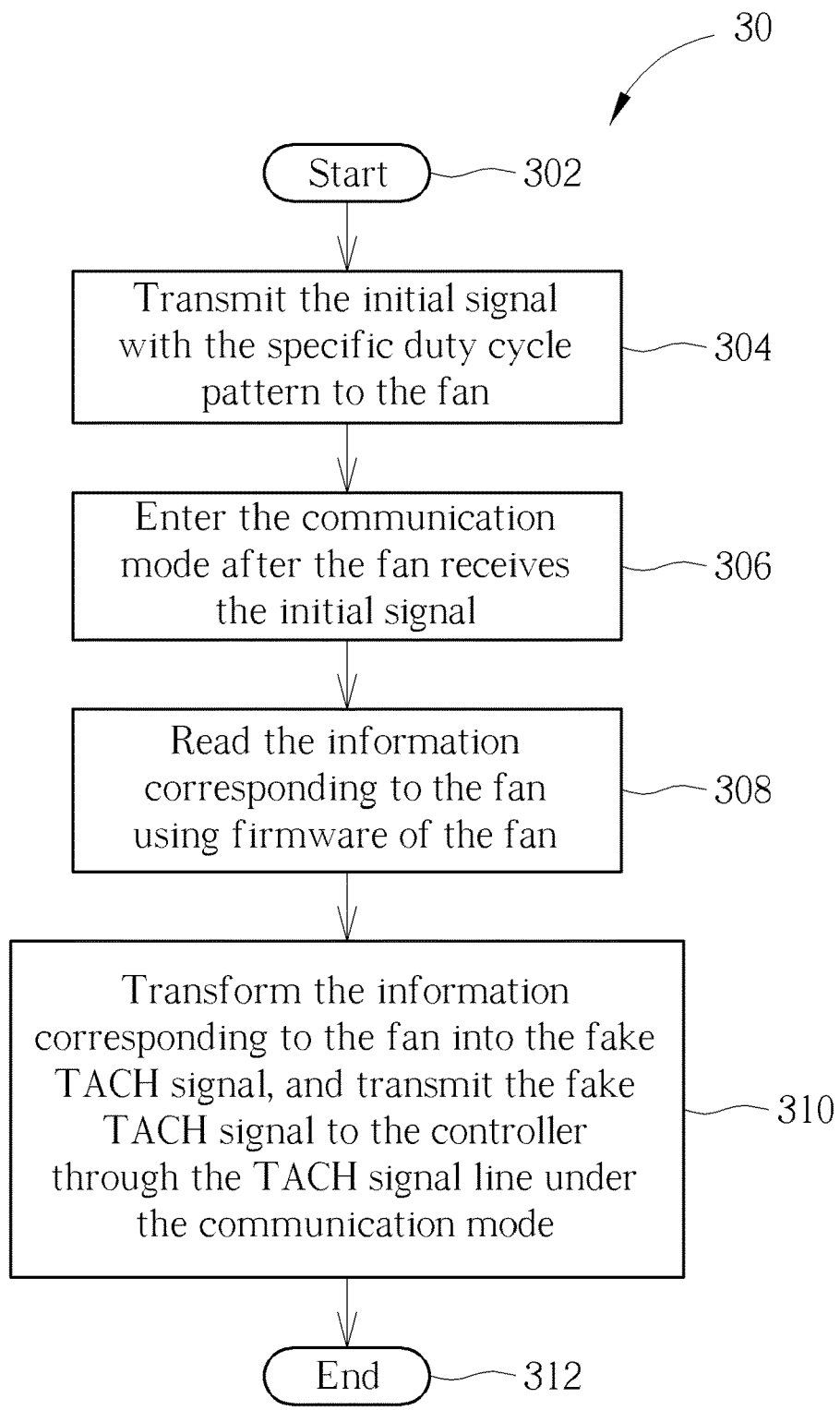
FIG. 3 is a schematic diagram of a fan communication method according to an embodiment of the present invention.

An operation method of the fan system 10 may be represented by a fan communication method 30, as shown in FIG. 3. The fan communication method 30 includes the following steps:

Step 302: Start.

Step 304: Transmit the initial signal SS with the specific duty cycle pattern to the fan 104.

Step 306: Enter the communication mode after the fan 104 receives the initial signal SS.

Step 308: Read the information corresponding to the fan 104 using firmware of the fan 104.

Step 310: Transform the information corresponding to the fan 104 into the fake TACH signal F_SS, and transmit the fake TACH signal F_SS to the controller 102 through the TACH signal line under the communication mode.

Step 312: End.

Further details regarding the operation of the fan communication method 30 are provided by the embodiments of the fan system 10, and are not narrated here for brevity.

Figure 4:
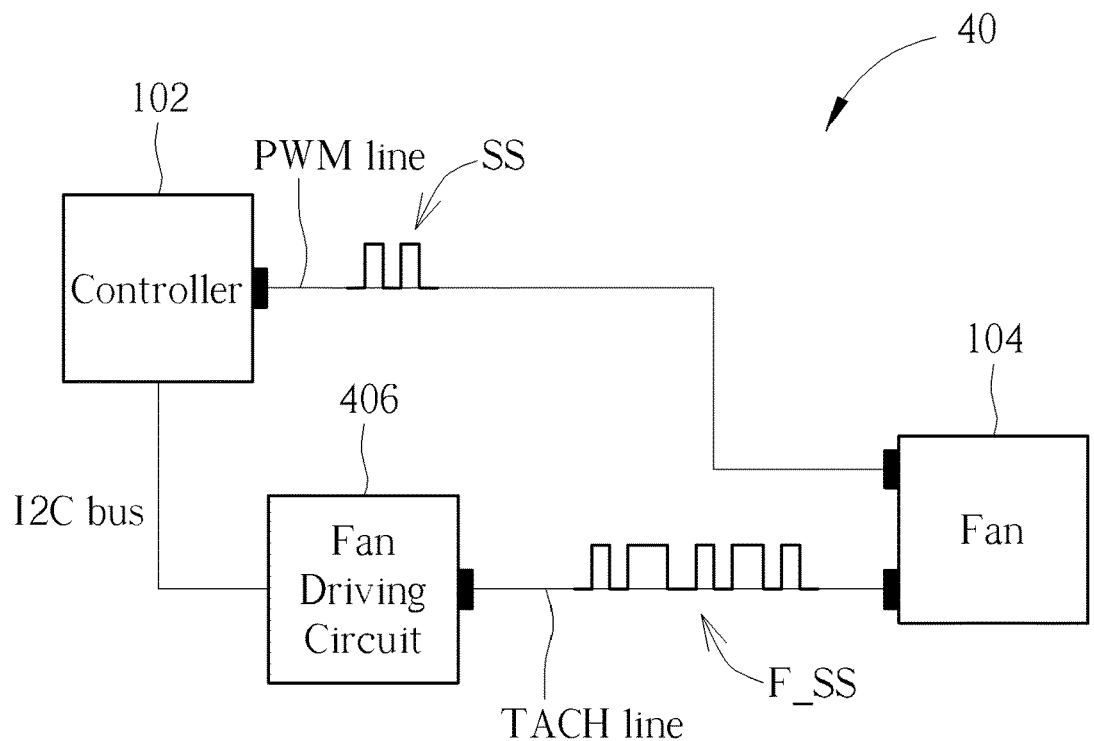
FIGS. 4 and 5 are schematic diagrams of fan systems according to an embodiment of the present invention.
Figure 5:
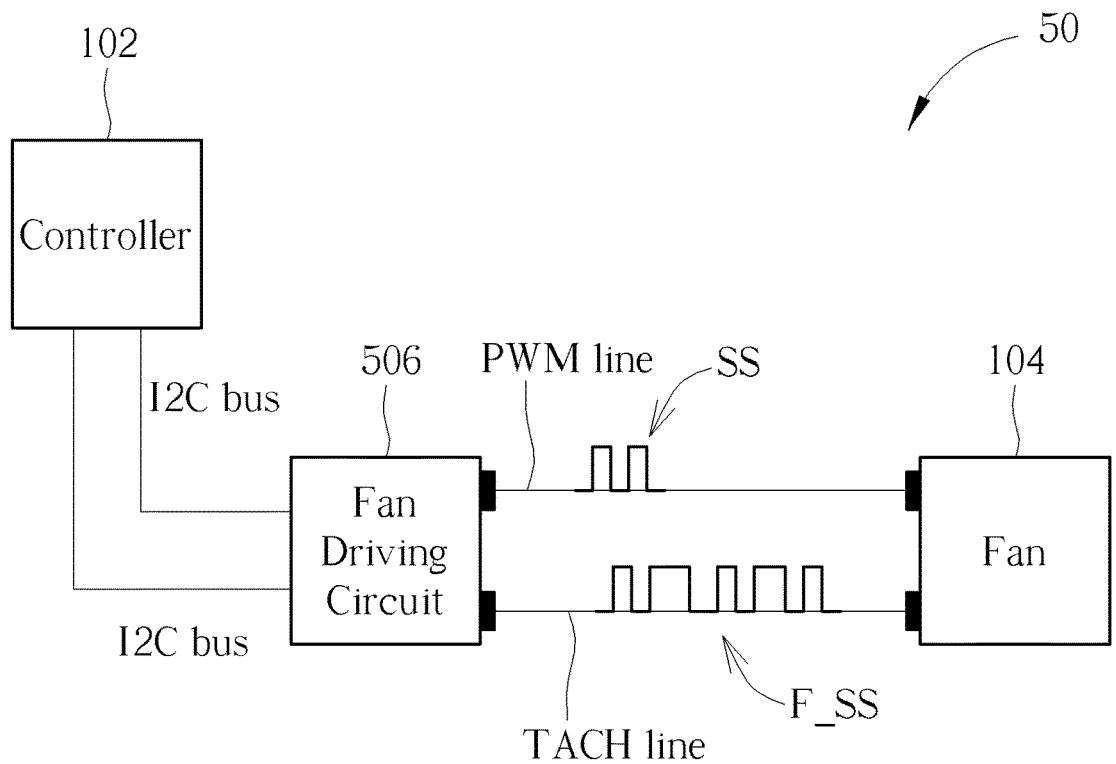

Another embodiment of the present invention represents a case when the controller 102 does not support controlling the fan 104, i.e. the controller 104 has no PWM pin/TACH pin and cannot transmit the signals via the PWM signal line and the TACH signal line. Refer to FIGS. 4 and 5, which are schematic diagrams of other fan systems 40, 50 according to an embodiment of the present invention. Since the fan systems 40, 50 are other embodiments of the fan system 10, reference signs with identical functions are inherited. Different from the fan system 10, the fan systems 40, 50 further include fan driving circuits 406, 506, which are connected between the controller 102 and the fan 104. In addition, an Inter-Integrated Circuit (I2C) bus is utilized for signal transmission between the fan driving circuits 406, 506 and the controller 102.

In FIG. 4, when the controller 102 does not support receiving the fake TACH signal F_SS from the fan 104, the fan driving circuit 406 is configured to receive the fake TACH signal F_SS from the fan 104, such that the fake TACH signal F_SS is transmitted to the controller 102 through the I2C bus. Alternative, as shown in FIG. 5, when the controller 102 neither supports receiving the fake TACH signal F_SS from the fan 104, nor supports transmitting the initial signal SS to the fan 104, the fan driving circuit 506 intermediates the fake TACH signal F_SS and the initial signal SS between the controller 102 and the fan 104.

Similarly, when the controller 102 is not capable of receiving the fake TACH signal F_SS from the fan 104, the fan driving circuits 406, 506 may intermediate the fake TACH signal F_SS to the controller 102 to implement the fan system.

Notably, the embodiments illustrate a concept of the present invention. Those skilled in the art may make proper modifications to the present invention according to different requirements. For example, the mapping table of the fake TACH signal or the specific duty cycle pattern of the initial signal may be adjusted according to different indications of users, manufacturers, or settings of computer systems. All these modifications belong to the scope of the present invention.

In summary, the present invention provides a communication method for a fan and a related fan system, which remotely reads information of the fan implemented in a conventional data center to reduce labor costs and time without requiring extra circuits or modifying circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication method for a fan, comprising:
  transmitting an initial signal with a specific duty cycle pattern to the fan;
  entering a communication mode after the fan receives the initial signal;
  reading information of the fan by a firmware of the fan; and
  transforming the information of the fan into a fake tachometer (TACH) signal and transmitting the fake TACH signal to a controller via a TACH signal line under the communication mode;
  wherein the fan is configured to enter the communication mode from a normal mode after receiving the initial signal, and the fan is configured to transmit revolution speed information of the fan in the normal mode;
  wherein the initial signal is generated by the controller and the controller transmits the initial signal to the fan via a pulse width modulation (PWM) signal line;
  wherein when the controller does not support transmitting the initial signal to the fan, or the controller does not support receiving the fake TACH signal from the fan, a fan driving circuit is configured to transmit the initial signal to the fan, and to receive the fake TACH signal from the fan, in order to transmit the fake TACH signal to the controller via an Inter-Integrated Circuit (I2C) bus.

2. The communication method for a fan of claim 1, further comprising:
  according to the fake TACH signal, referencing a mapping table by the controller to obtain the information corresponding to the fan.

3. The communication method for a fan of claim 2, wherein the fake TACH signal is not related to a revolution speed of the fan.

4. The communication method for a fan of claim 1, wherein a frequency characteristic of the fake TACH signal and a revolution speed signal corresponding to the revolution speed information of the fan are identical.

5. A fan system, comprising:
a controller, configured to transmit an initial signal with a specific duty cycle pattern; and
a fan, configured to receive the initial signal, enter a communication mode after receiving the initial signal to read information of the fan, and transform the information of the fan into a fake tachometer (TACH) signal, such that the fake TACH signal is transmitted to a controller via a TACH signal line under the communication mode;
a fan driving circuit, coupled to the controller and the fan, configured to transmit the initial signal to the fan, and to receive the fake TACH signal from the fan, in order to transmit the fake TACH signal to the controller via an Inter-Integrated Circuit (I2C) bus when the controller does not support transmitting the initial signal to the fan, or the controller does not support receiving the fake TACH signal from the fan;
wherein the fan is configured to enter the communication mode from a normal mode after receiving the initial signal, and the fan is configured to transmit revolution speed information of the fan in the normal mode;
wherein the controller is configured to transmit the initial signal to the fan via a pulse width modulation (PWM) signal line.

6. The fan system of claim 5, wherein the controller is configured to obtain the information corresponding to the fan by referencing a mapping table according to the fake TACH signal.

7. The fan system of claim 6, wherein the fake TACH signal is not related to a revolution speed of the fan.

8. The fan system of claim 5, wherein a frequency characteristic of the fake TACH signal and a revolution speed signal corresponding to the revolution speed information of the fan are identical.

* * * * *